United States Patent
Torti et al.

(10) Patent No.: US 6,822,184 B2
(45) Date of Patent: Nov. 23, 2004

(54) PROCESS TO WELD STEEL TO COPPER

(75) Inventors: Aldo Torti, San Carlo Canavese (IT); Mario Merlin, San Carlo Canavese (IT); Sebastiaro Ferrero, Torino (IT)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 10/691,081

(22) Filed: Oct. 22, 2003

(65) Prior Publication Data

US 2004/0124180 A1 Jul. 1, 2004

Related U.S. Application Data

(60) Provisional application No. 60/420,796, filed on Oct. 22, 2002.

(51) Int. Cl.[7] ............................................. B23K 11/20
(52) U.S. Cl. ................................. 219/118; 219/56.22
(58) Field of Search .............................. 219/118, 61.2, 219/56.22, 617

(56) References Cited

U.S. PATENT DOCUMENTS

| | | | | | |
|---|---|---|---|---|---|
| 2,190,267 A | * | 2/1940 | Light | .......................... | 228/244 |
| 2,919,342 A | * | 12/1959 | Kohler et al. | ................ | 219/104 |
| 3,435,183 A | * | 3/1969 | Vagi | ............................ | 219/107 |
| 3,935,417 A | * | 1/1976 | Umino et al. | ........ | 219/137 WM |

* cited by examiner

Primary Examiner—Clifford C. Shaw
(74) Attorney, Agent, or Firm—Ostrolenk, Faber, Gerb & Soffen, LLP

(57) ABSTRACT

A process for joining a steel terminal to a copper electrode comprises applying a thin silver-copper flash to the surface of a copper electrode and bringing a steel surface into contact with the flash during high frequency welding. The weldment is improved compared to conventional welds that do not incorporate the flash layer. For example, a silver—18 wt % copper alloy having a thickness of about 180 microns produced uniform, high quality welds between nickel steel terminals and 99.999% pure copper electrodes.

21 Claims, 1 Drawing Sheet

PROCESS TO WELD STEEL TO COPPER

RELATED APPLICATION

This application claims the benefit of U.S. Provisional Application No. 60/420,796, filed Oct. 22, 2003, entitled "Process to Weld Steel to Copper for Electrical Terminal," Which is incorporated by reference-herein in their entirety.

FIELD OF THE INVENTION

The field of the invention relates to high frequency welding of steel to copper, especially a steel terminal to a copper electrode of a semiconductor device.

BACKGROUND OF THE INVENTION

Semiconductor power devices as well as other electrical devices (for example, stud mounted diodes) which have large copper electrodes are commonly provided with a steel terminal which is connected to the copper terminal and which extends outwardly for convenient connection to external connectors. The copper electrode commonly has a large area planar surface and the steel terminal is commonly a flat piece of steel with its end bent at a 90° angle so that the bottom surface of the bent end can make surface to surface contact to the flat copper surface with the steel body (which may be tubular) extending perpendicularly away from the at contact surface. The confronting surfaces of the steel and copper members are then mechanically and electrically connected as by welding.

The welds which have been formed in the past do not have a uniform quality, and the weld is sometimes defective. This defect is frequently not detected until the semiconductor device has been fully assembled and is in operation in a circuit.

It would be very desirable to provide a weld process which makes a uniformly reliable weld of copper to steel.

SUMMARY OF THE INVENTION

A process for welding steel to copper comprises coating a surface of the copper with a thin flash of an alloy of silver and copper and high frequency welding the steel to the surface of the copper. An advantage of the process is that the weld between the steel and the copper has a uniform, high quality.

Other features and advantages of the present invention will become apparent from the following description of the invention which refers to the accompanying drawings.

DETAILED DESCRIPTION OF THE PREFERRED EMBODIMENTS

Figure 1:
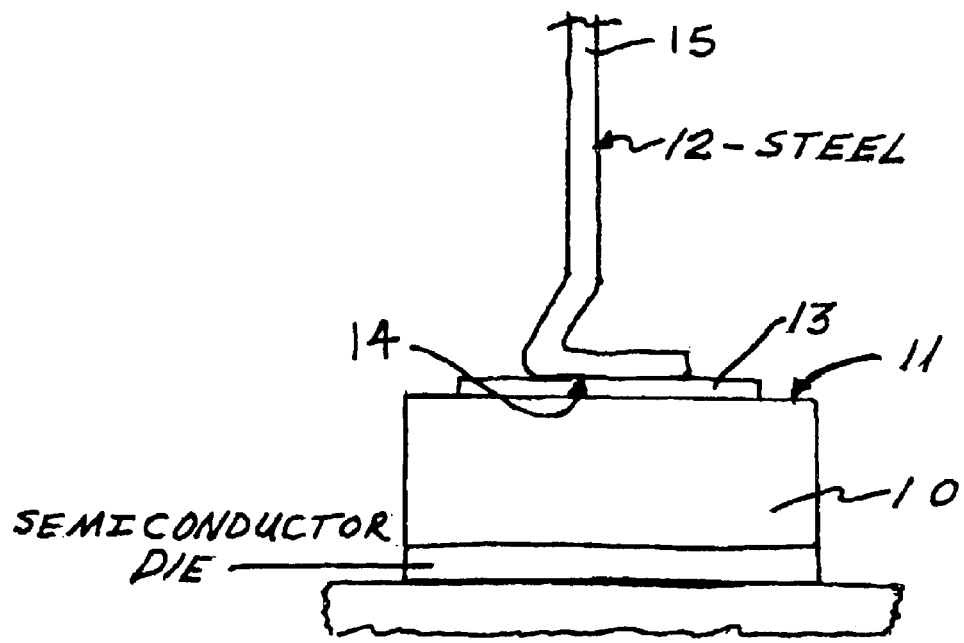
FIG. 1 shows one embodiment of the present invention prior to welding.

Referring to the embodiment shown in FIG. 1, a copper electrode is shown in FIG. 1 as a slug of copper 10 having a flat contact surface 11. Copper electrode 10 is connected to a semiconductor device by any known joining method, such as a conductive adhesive, soldering, sputtering, chemical vapor deposition or another deposition process.

Figure 2:
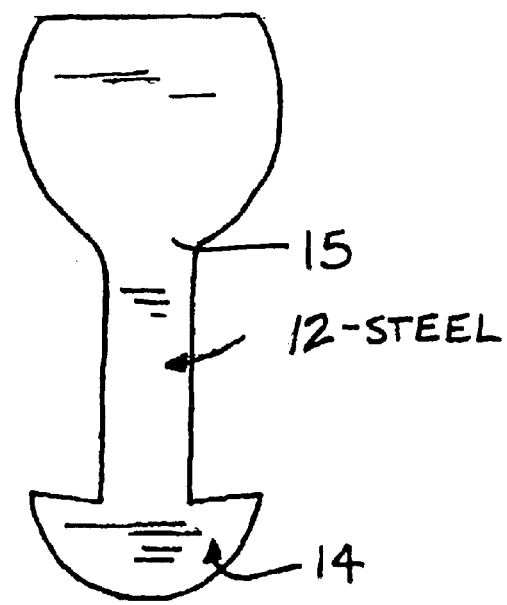
FIG. 2 is a plan view of a steel terminal according to one embodiment of the present invention.

For example, the steel terminal 12 in FIG. 1 is bent to shape from a flat strap such as the flat strap shown in FIG. 2. Bending the steel terminal 12 provides a surface 14 for welding to the surface 11 of the copper electrode 10.

At least a portion of the top surface 11 of the copper electrode 10 is covered by the thin flash layer 13, which may be a silver alloy such-as a binary silver-copper alloy with about 18% copper by weight. The quality of the weldment depends on both the composition of the flash layer and the thickness of the flash layer. The flash layer 13 of one embodiment is about 180 micrometers (microns) thick. In one embodiment, the thickness of the flash layer may be selected in a range from 100 microns to 500 microns. More preferably, the flash layer has a thickness of at least, 150 microns and no greater than 500 microns, which provides a steel:copper weldment with a smooth gradient in silver concentration from steel to pure copper in at least a portion of the weldment. For example, the silver alloy may be selected having a range of copper in the alloy from 15 wt % to no greater than 70 wt %. In another embodiment, the amount of copper is at least 30 wt % and no greater than 70 wt % for a flash layer having a thickness of 180 microns. In yet another embodiment, the amount of copper is at least 50 wt % and no greater than 70 wt % for a flash layer having a thickness in a range from 100 microns to 500 microns, improving the microstructure of the heat affected zone.

In one embodiment, the alloy is a binary alloy of silver and copper with no substantial impurities. Herein, substantial impurities refer to impurities that affect the operability of the flash layer to provide a reliable weld between the steel terminal and the copper electrode.

In one embodiment, the copper to which the steel is to be joined is an oxygen-free high conductivity copper such as a 99.999% pure copper. In one embodiment, the weld receiving surface 11 is commonly flat, but the surface 11 may have any shape. The steel 12 to be joined to the copper may be a terminal 12 having an elongated strip with one end bent out of the plane of the strap and defining a surface 14 which is at least partly coextensive with the shape of the weld receiving surface 11. The extending body 15 of the steel terminal 12 may be of any conventional shape such as flat or tubular. For example, the steel is a nickel steel comprising about 42% Fe; 0.8% Cr; 1.2% Mn; 1.7% Mo (all by weight). The remainder of the steel alloy comprises nickel and small amounts of other impurities that do not affect the weldability of the steel substantially.

In one embodiment, high frequency welding is used to join the steel terminal to the copper electrode prepared by adding a thin layer of flashing. High frequency welding uses an alternating current in a range from 100 kHz to 800 kHz. Heating during high frequency welding is advantageously localized near the surfaces joined, avoiding damage to semiconductor dies. For example, a frequency in a range from about 10 to 100 kHz, preferably about 50 kHz is used for a binary silver: 18% copper alloy flash of 180 microns. For example, a high quality weldment results at a voltage in a range from about 1 to 2 volts and a current in a range from 5,000 to 10,000 Amps (5–10 kA).

Although the present invention has been described in relation to particular embodiments thereof, many other variations and modifications and other uses will become apparent to those skilled in the art. It is preferred, therefore, that the present invention be limited not by the examples herein, but only by the claims themselves.

What is claimed is:

1. A process for joining a steel to a copper, comprising:
   applying a copper-containing flash layer to at least a portion of a clean surface of the copper;

bringing the steel into direct contact with the flash layer; and welding the steel to a portion of the at least a portion of the clean surface of the copper such that the heat of welding is localized to the surface of the copper and a metallurgical bond exists between at least a portion of the steel terminal and a portion of the copper electrode.

2. The process of claim 1, wherein the step of welding includes using an alternating current frequency in a range of at least 10 kHz to no greater than 100 kHz.

3. The process of claim 1, wherein the flash layer is selected from an alloy comprising silver and copper.

4. The process of claim 3, wherein the alloy of the flash layer is selected to comprise copper in a range from 30 wt % to 70 wt %.

5. The process of claim 4, wherein the alloy of the flash layer is selected to be a binary alloy.

6. The process of claim 3, wherein the alloy of the flash layer is selected to comprise copper in a range from at least 50 wt % to 70 wt %.

7. The process of claim 1, wherein the copper is 99.999 wt % pure copper.

8. The process of claim 1, wherein the step of applying includes depositing a thickness of the flash layer in a range of at least 100 microns to no greater than 500 microns.

9. The process of claim 8, wherein the thickness of the flash layer is at least 150 microns.

10. The process of claim 1, wherein the step of welding includes applying the alternating current inductively.

11. The process of claim 1, wherein the steel is bent to shape from a flat strap.

12. The process of claim 1, wherein the copper is a copper electrode of a semiconductor device, and the heat of welding is localized to the surface such that the semiconductor device is undamaged by the process.

13. The process of claim 12, wherein the steel is a terminal.

14. The process of claim 13, wherein the steel is an alloy comprising nickel and iron.

15. The process of claim 14, wherein the steel is an alloy comprising about 42 wt % Fe, 0.8 wt % Cr, 1.2 wt % Mn and 1.7 wt % Mo.

16. The process of claim 14, wherein the step of welding includes applying an alternating current frequency in a range of at least 10 kHz to no greater than 100 kHz.

17. The process of claim 16, wherein the flash layer comprises an alloy of copper and silver.

18. The process of claim 17, wherein the alloy of the flash layer comprises copper in a range from 30 wt % to no greater than 70 wt %.

19. The process of claim 18, wherein the alloy of the flash layer comprises copper in a range from at least 50 wt %.

20. The process of claim 17, wherein the step of applying includes depositing a thickness of the flash layer in a range of at least 100 microns to no greater than 500 microns.

21. The process of claim 20, wherein the step of welding includes applying the alternating current inductively.

* * * * *